United States Patent
Morioka et al.

(10) Patent No.: US 8,931,771 B2
(45) Date of Patent: Jan. 13, 2015

(54) DEVICE FOR REMOVING CLAMPING BLOCK MADE OF RESIN AND DEVICE FOR CLAMPING CLAMPING BLOCK MADE OF RESIN

(75) Inventors: Takeshi Morioka, Wako (JP); Takayuki Nodomi, Wako (JP); Kazuya Kuwabara, Wako (JP); Masahiro Kigure, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 676 days.

(21) Appl. No.: 13/159,706

(22) Filed: Jun. 14, 2011

(65) Prior Publication Data

US 2012/0001375 A1    Jan. 5, 2012

Related U.S. Application Data

(60) Provisional application No. 61/360,261, filed on Jun. 30, 2010.

(30) Foreign Application Priority Data

Apr. 15, 2011 (JP) .................................. 2011-090859
Apr. 15, 2011 (JP) .................................. 2011-090860

(51) Int. Cl.
*B23Q 3/00* (2006.01)
*B25B 1/24* (2006.01)
*B25B 5/16* (2006.01)
*B25B 5/10* (2006.01)
*B23Q 3/06* (2006.01)
*B23Q 3/08* (2006.01)

(52) U.S. Cl.
CPC ................ *B25B 5/105* (2013.01); *B23Q 3/063* (2013.01); *B23Q 3/086* (2013.01); *B25B 5/106* (2013.01)

USPC ........................................ 269/285; 269/289 R

(58) Field of Classification Search
CPC ................................... B23Q 3/00; B25B 5/10
USPC ....... 269/285, 289 R, 86, 123, 138, 199, 229, 269/231–234
See application file for complete search history.

(56) References Cited

U.S. PATENT DOCUMENTS 2,422,773 A *   6/1947   Colwill ............................ 269/99
6,109,908 A *   8/2000   Ikehara et al. ................. 425/545

FOREIGN PATENT DOCUMENTS

JP          60-118441           6/1985

* cited by examiner

*Primary Examiner* — Lee D Wilson
*Assistant Examiner* — Seahee Yoon
(74) *Attorney, Agent, or Firm* — Rankin, Hill & Clark LLP

(57) ABSTRACT

When, while a resin-made clamping block molded to cover a part of a turbine blade is placed on a seat part, paired sliders disposed on opposite sides of the seat part are made to move closer to the resin-made clamping block, paired wedge members provided respectively on the paired sliders engage with notches formed respectively in paired side surfaces, opposed to each other, of the resin-made clamping block to generate cracks. Accordingly, it is possible to divide the resin-made clamping block into at least two pieces and to reliably remove the resin-made clamping block from the turbine blade. Furthermore, since the resin-made clamping block is not broken by a mechanical strike, there is no fear that the turbine blade might be damaged due to an erroneous setting of the strike force.

12 Claims, 9 Drawing Sheets

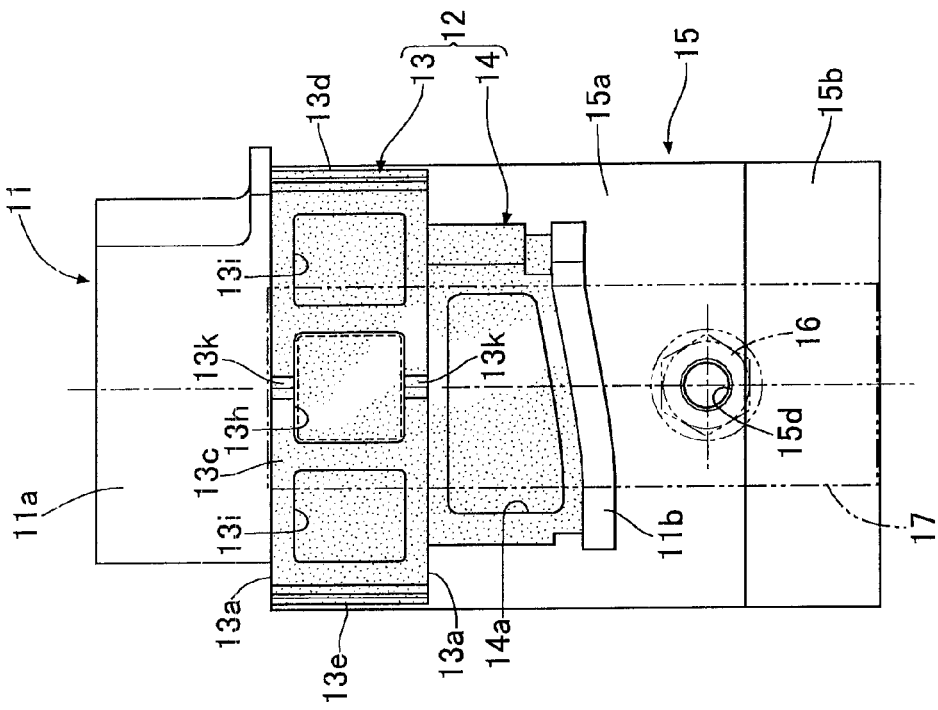
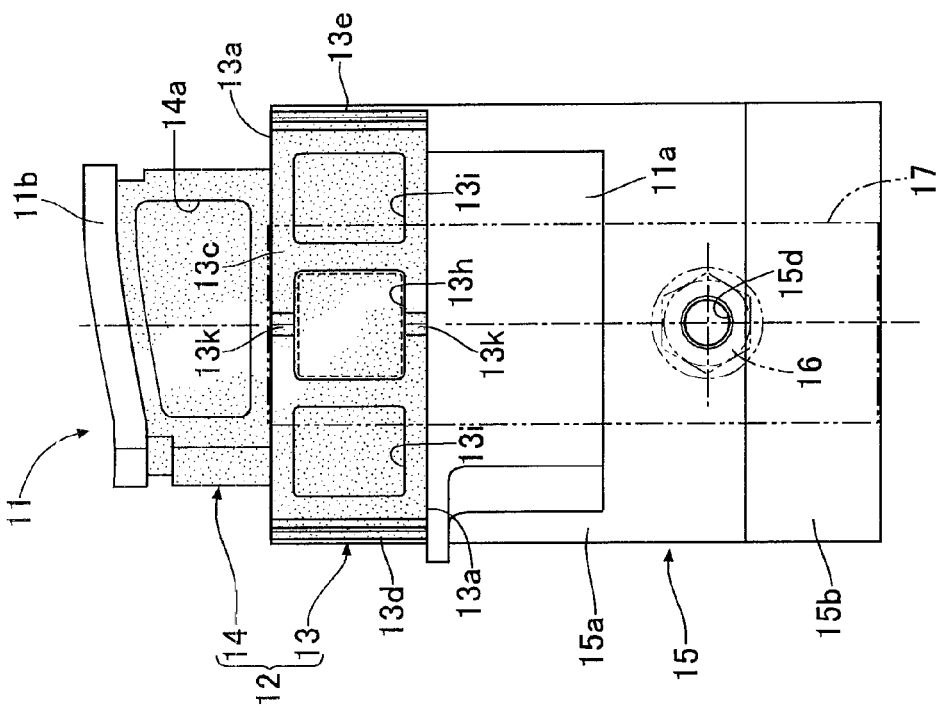

DEVICE FOR REMOVING CLAMPING BLOCK MADE OF RESIN AND DEVICE FOR CLAMPING CLAMPING BLOCK MADE OF RESIN

BACKGROUND OF THE INVENTION

1. Field of the Invention

The present invention relates to: a device for removing a clamping block made of resin, configured to separate and remove the resin-made clamping block from a turbine blade, after a mechanical processing is applied to the turbine blade in a state in which the resin-made clamping block molded to cover a part of the turbine blade is fixed to a clamping jig; and a device for clamping a clamping block made of resin, configured so that a mechanical processing is applied to a turbine blade in a state in which the resin-made clamping block molded to cover a part of the turbine blade is fixed to a clamping jig.

2. Description of the Related Art

In order to perform a polishing processing to a turbine blade of a gas turbine engine by a polishing device, it is necessary to clamp the turbine blade to a processing table, but there is a possibility that, when a turbine blade of a complicated shape is directly clamped, damage or deformation may occur on the blade. In view of the problem, Japanese Patent Application Laid-open No. 60-118441 has publicly made known a configuration in which a clamping block made of resin is molded so as to cover a part of a turbine blade and a polishing processing of the turbine blade is performed in a state where the resin-made clamping block is clamped.

Meanwhile, after the polishing processing of the turbine blade has been finished, it is necessary to separate and remove the resin block, which becomes unnecessary, from the turbine blade. The invention described in the above Japanese Patent Application Laid-open No. 60-118441 has a configuration in which a mechanical strike is applied to the resin block which has been cooled below a brittle temperature, and thus broken pieces of the resin block are removed without any piece remaining on the turbine blade side while not damaging the turbine blade.

However, when the resin block is separated from the turbine blade by applying a mechanical strike, it is difficult to adjust the magnitude of the strike force; accordingly, there has been a possibility that the resin block might not be broken smoothly or the turbine blade might be damaged.

Further, when a clamping block made of resin is fixed to a processing table by a clamping jig, if a position of the resin-made clamping block relative to the clamping jig is displaced, there is a possibility that the processing accuracy of the turbine blade may be degraded. In view of this problem, the invention described in the above Japanese Patent Application Laid-open No. 60-118441 has a configuration in which a groove formed in the resin-made clamping block is engaged with a positioning strip on a supporting surface that is formed on the processing table thereby to position the resin-made clamping block with respect to the supporting surface.

However, when the resin-made clamping block is positioned only by the engagement of the groove with the positioning strip, the resin-made clamping block can be positioned only in one posture, which has been a problem in that the working efficiency may be degraded when it is necessary to apply a processing to the turbine blade from various directions.

SUMMARY OF THE INVENTION

The present invention has been made in view of the above circumstances, and a first object thereof is to enhance the efficiency of the work to separate and remove a clamping block made of resin from a turbine blade.

Further, a second object of the present invention is to increase the degree of freedom in clamping a clamping block made of resin, which is formed by insert molding around a turbine blade, by a clamping jig.

In order to achieve the above first object, according to a first feature of the present invention, there is provided a device for removing a clamping block made of resin, configured to separate and remove the resin-made clamping block from a turbine blade, after a mechanical processing is applied to the turbine blade in a state in which the resin-made clamping block molded to cover a part of the turbine blade is fixed to a clamping jig, wherein the device comprises: a seat part on which the resin-made clamping block is placed; a pair of sliders which are positioned on opposite sides of the seat part, and which can move closer to and away from the resin-made clamping block; and a pair of wedge members provided respectively on the paired sliders and generating cracks by engaging with first notches which are formed respectively in a pair of side surfaces, opposed to each other, of the resin-made clamping block.

With the above configuration, when, while the resin-made clamping block molded to cover a part of the turbine blade is placed on the seat part, the paired sliders disposed on the opposite sides of the seat part are made to move closer to the resin-made clamping block, the paired wedge members provided respectively on the paired sliders engage with the first notches formed respectively in the paired side surfaces, opposed to each other, of the resin-made clamping block to generate cracks. Accordingly, it is possible to divide the resin-made clamping block into at least two pieces and to reliably remove the resin-made clamping block from the turbine blade. Furthermore, since the resin-made clamping block is not broken by a mechanical strike, there is no fear that the turbine blade might be damaged due to an erroneous setting of the strike force.

According to a second feature of the present invention, in addition to the first feature, there is provided the device for removing a clamping block made of resin, wherein, as said seat part, two seat parts are provided so as to be separated from each other by a predetermined distance, second notches are formed respectively in a lower face and an upper face of the resin-made clamping block which is placed so as to be laid on the two seat parts, and the device further comprises an ascending-and-descending member that is provided in a manner capable of ascending and descending with respect to the two seat parts and that generates cracks with the second notches being starting portions by pressing the resin-made clamping block from above.

With the above configuration, the second notches are formed respectively in the lower face and the upper face of the resin-made clamping block that is placed so as to be laid on the two seat parts, which are provided so as to be separated from each other by a predetermined distance. Accordingly, when the resin-made clamping block is pressed from the above by the ascending-and-descending member, bending moment is generated. This makes it possible to generate cracks with the second notches being starting portions, thereby enabling the resin-made clamping block to be divided into four pieces from the two first notches and the two second notches, so that the resin-made clamping block can be reliably removed.

According to a third feature of the present invention, in addition to the second feature, there is provided the device for removing a clamping block made of resin, wherein a drive cam face provided on the ascending-and-descending member and follower cam faces provided respectively on the paired sliders abut against each other, so that the paired sliders move closer to each other in accordance with a downward movement of the ascending-and-descending member.

With the above configuration, the drive cam face provided on the ascending-and-descending member and the follower cam faces provided respectively on the paired sliders abut against each other. Accordingly, with only a simple action of descending the ascending-and-descending member, the paired sliders can be made to move closer to each other in accordance with the downward movement of the ascending-and-descending member.

In order to achieve the above second object, according to a fourth feature of the present invention, there is provided a device for clamping a clamping block made of resin, configured so that a mechanical processing is applied to a turbine blade in a state in which the resin-made clamping block molded to cover a part of the turbine blade is fixed to a clamping jig, wherein a positioning hole having a rotationally-symmetric shape is formed in at least one reference surface of the resin-made clamping block, a positioning projection having a rotationally-symmetric shape is formed on a bottom wall part of the clamping jig, the positioning projection being capable of being fitted into the positioning hole in a plurality of postures which are different by predetermined degrees, and the resin-made clamping block is fixed to the clamping jig by a clamping member in a state in which the positioning projection is fitted into the positioning hole in one of the postures and the one reference surface is in intimate contact with the bottom wall part.

With the above configuration, the positioning hole having a rotationally-symmetric shape is formed in at least one reference surface of the resin-made clamping block and the positioning projection having a rotationally-symmetric shape that can be fitted into the positioning hole in the plurality of postures which are different by predetermined degrees is formed on the bottom wall part of the clamping jig. Accordingly, the resin-made clamping block can be fixed to the clamping jig in the plurality of postures by fixing the resin-made clamping block to the clamping jig by the clamping member in the state in which the positioning projection is fitted into the positioning hole in one of the postures and the one reference surface is in intimate contact with the bottom wall part. This enables the easy processing of an arbitrary portion of the turbine blade.

According to a fifth feature of the present invention, in addition to the fourth feature, there is provided the device for clamping a clamping block made of resin, wherein the resin-made clamping block includes the positioning holes provided respectively in a plurality of the reference surfaces.

With the above configuration, since the resin-made clamping block includes the positioning holes provided respectively in the plurality of reference surfaces, it is possible to further increase a number of fixing postures of the resin-made clamping block by fitting the positioning holes of the different reference surfaces of the resin-made clamping block onto the positioning projection of the bottom wall part of the clamping jig.

Here, a first reference surface 13b of an embodiment corresponds to the lower face or reference surface of the present invention; a second reference surface 13c of the embodiment corresponds to the upper face or reference surface of the present invention; a first end surface 13d and a second end surface 13e of the embodiment correspond to the side surfaces of the present invention; notches 13m, 13n of the embodiment correspond to the first notches of the present invention; and notches 13j, 13k of the embodiment correspond to the second notches of the present invention.

The above and other objects, characteristics and advantages of the present invention will be clear from detailed descriptions of the preferred embodiment which will be provided below while referring to the attached drawings.

BRIEF DESCRIPTION OF THE DRAWINGS

FIGS. 1 to 6B show an embodiment of the present invention:

FIG. 1 is a perspective view of a turbine blade;

FIG. 2 is a perspective view of a clamping block made of resin into which the turbine blade is inserted;

FIG. 3 is a sectional view taken along a line 3-3 in FIG. 2;

FIG. 6A is a view seen from a direction of an arrow 6A in FIG. 4B and

FIG. 6B is a view corresponding to FIG. 6A and explaining an operation.

DESCRIPTION OF THE PREFERRED EMBODIMENT

An embodiment of the present invention will be described below based on FIGS. 1 to 6B.

Figure 1:
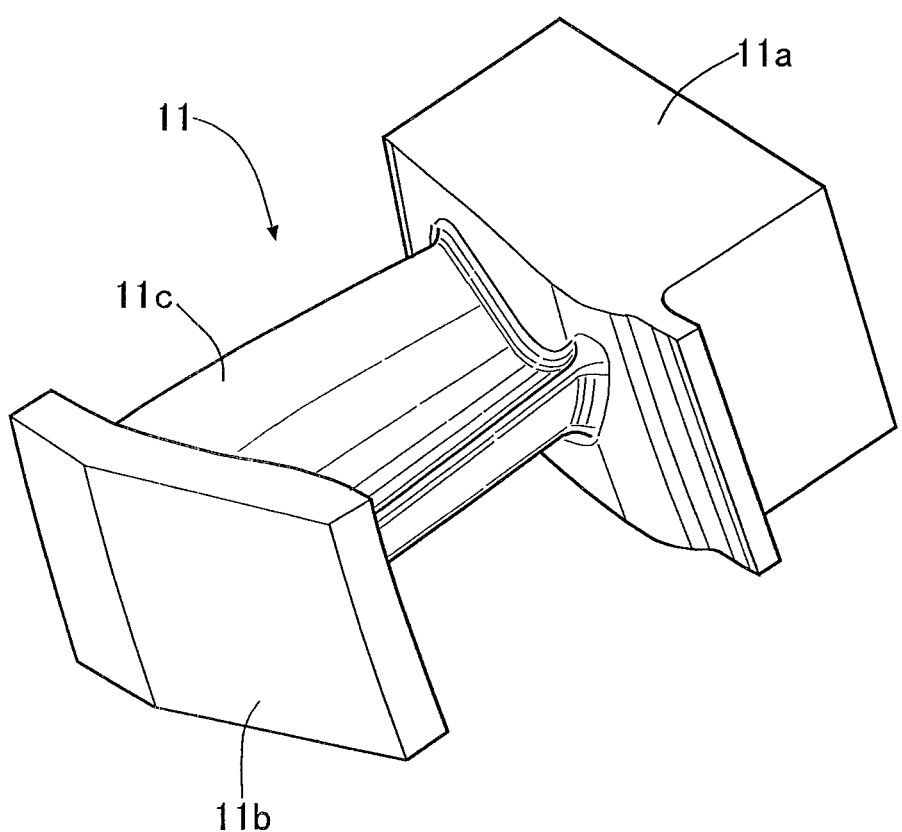

FIG. 1 shows a half-finished product of a turbine blade 11 formed by forging of a high-pressure turbine for a gas turbine engine. The turbine blade 11 includes a base end portion 11a fixed to a rotor, which is not illustrated, a tip end portion 11b extending in a circumferential direction around the rotor as a center thereof, and a blade portion 11c connecting the base end portion 11a and the tip end portion 11b in a radial direction of the rotor. At the base end portion 11a of the turbine blade 11, a so-called Christmas tree for connecting it to the rotor is processed by grinding.

Figure 2:
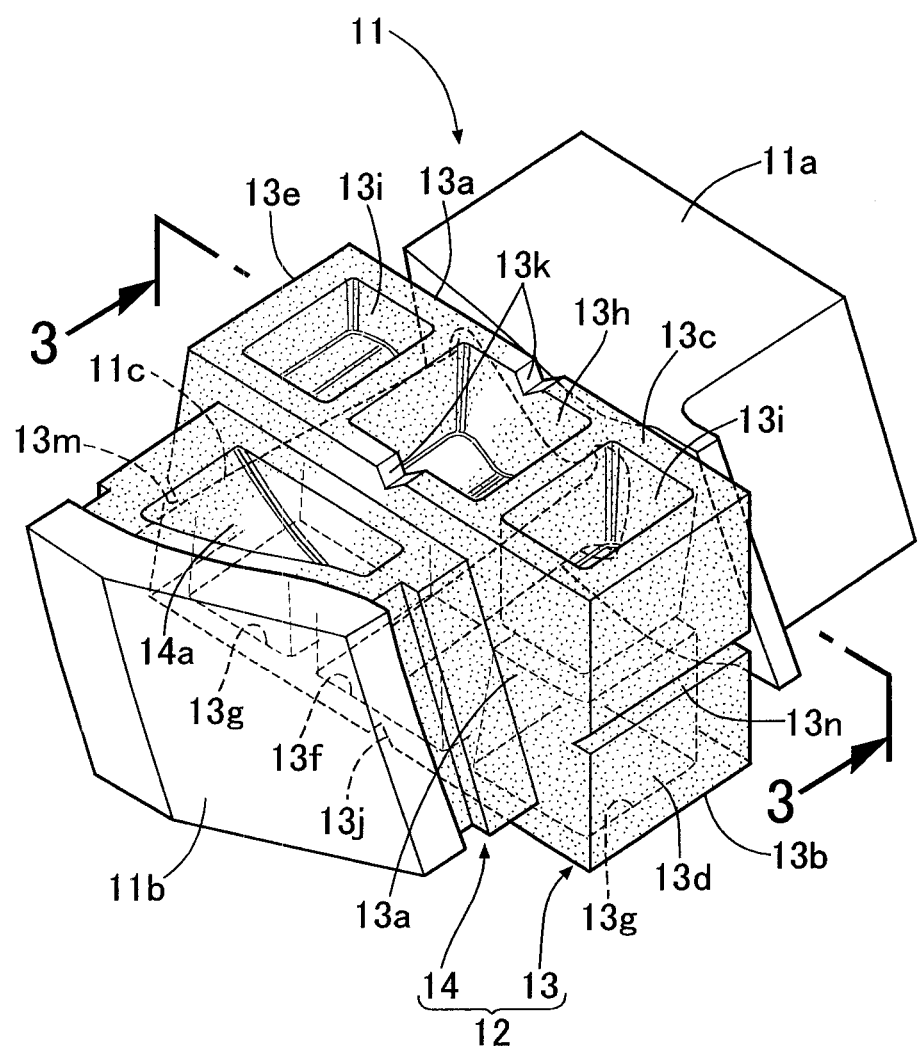
Figure 3:
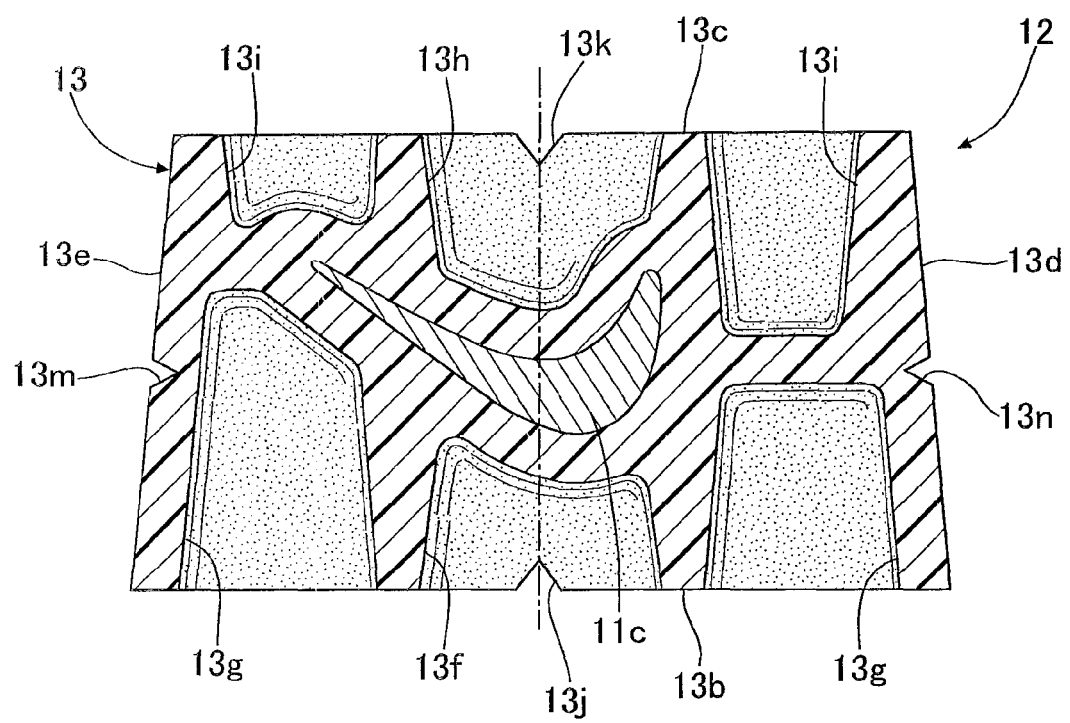

As shown in FIGS. 2 and 3, in order to fix the turbine blade 11 to a processing table without damaging or deforming it when a Christmas tree is processed by grinding the base end portion 11a of the turbine blade 11, a clamping block 12 made of resin is integrally molded so as to cover the blade portion 11c of the turbine blade 11. The molding of the resin-made clamping block 12 is performed by fixing the turbine blade 11 in place inside a die and injecting molten resin into a cavity defined between the turbine blade 11 and the die.

The resin-made clamping block 12 is formed by a first block 13 covering a base end portion 11a side of the blade portion 11c and a second block 14 covering a tip end portion 11b side of the blade portion 11c. The first block 13 includes: two side surfaces 13a, 13a each formed of a trapezoidal shape having an upper base, a lower base, and two oblique sides; a first reference surface 13b sandwiched between the lower bases of the two side surfaces 13a, 13a; a second reference surface 13c sandwiched between the upper bases of the two side surfaces 13a, 13a; a first end surface 13d sandwiched between one oblique sides of the two side surfaces 13a, 13a; and a second end surface 13e sandwiched between the other oblique sides of the two side surfaces 13a, 13a.

One positioning hole 13f forming a square shape and two weight-cutting holes 13g, 13g positioned on opposite sides of the positioning hole 13f and each forming a rectangular shape are formed in the first reference surface 13b, and one positioning hole 13h forming a square shape and two weight-cutting holes 13i, 13i positioned on opposite sides of the positioning hole 13h and each forming a rectangular shape are formed in the second reference surface 13c. The positioning holes 13f, 13h and the weight-cutting holes 13g, 13g; 13i, 13i are slightly tapered so as to be decreased in size in depth directions thereof.

Weight-cutting holes 14a, 14a are formed respectively in two faces of the second block 14 that are opposed to each other. Due to the positioning holes 13f, 13h and the weight-cutting holes 13g, 13g; 13i, 13i; 14a, 14a, the thickness of each part of the resin-made clamping block 12 is suppressed to on the order of 3 mm at the maximum. Accordingly, resin sink marks generated at the time of injection-molding of the resin-made clamping block 12 can be suppressed to the minimum, thereby enhancing the dimensional accuracy.

A V-shaped notch 13j is formed in a middle part in a longitudinal direction of the first reference surface 13b, and a V-shaped notch 13k is formed in a middle part in a longitudinal direction of the second reference surface 13c. Furthermore, notches 13n, 13m are formed respectively in the first end surface 13d and the second end surface 13e.

Figure 4A:
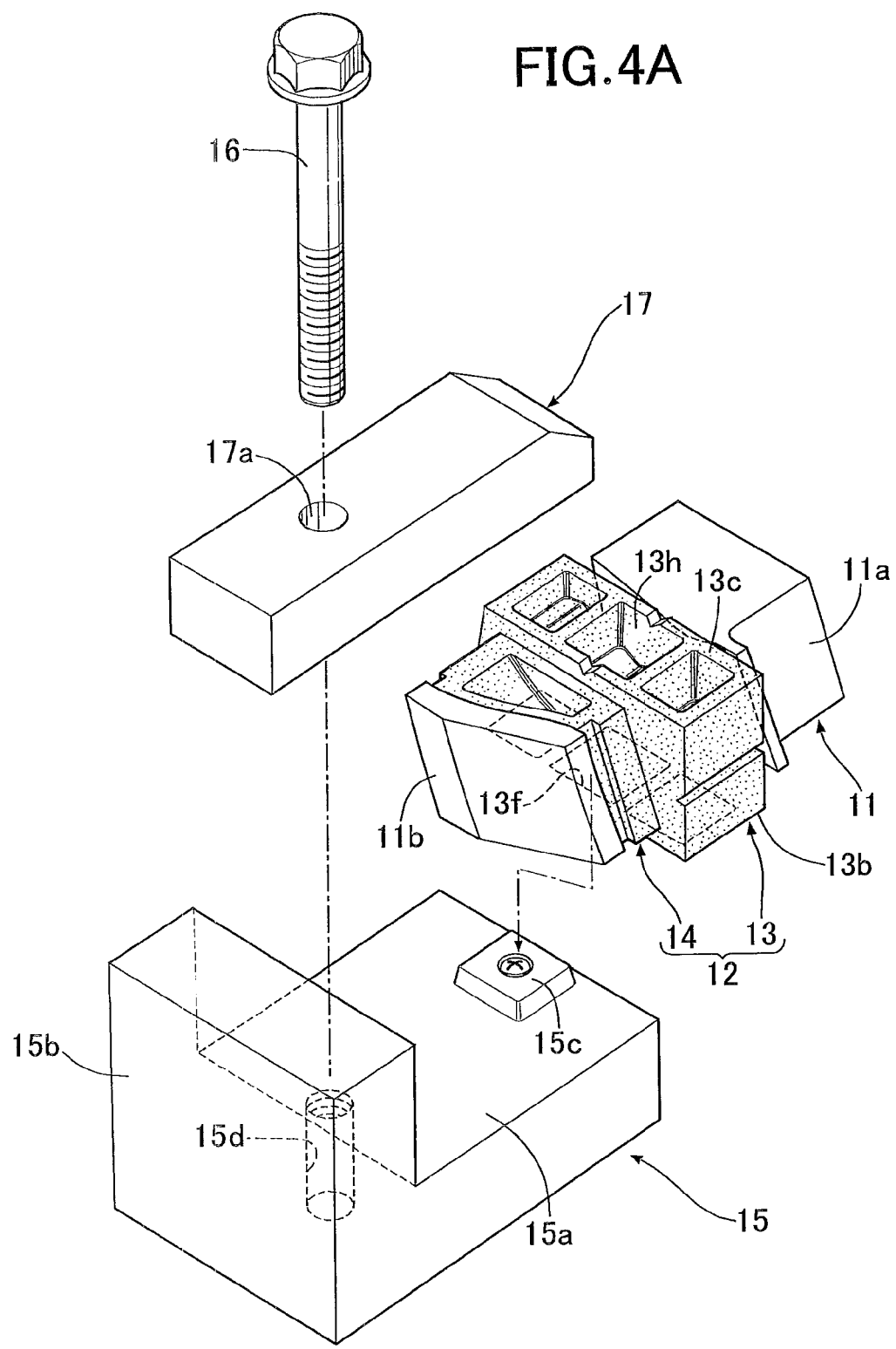
FIG. 4A is a perspective view of a clamping jig (in an exploded state)
Figure 4B:
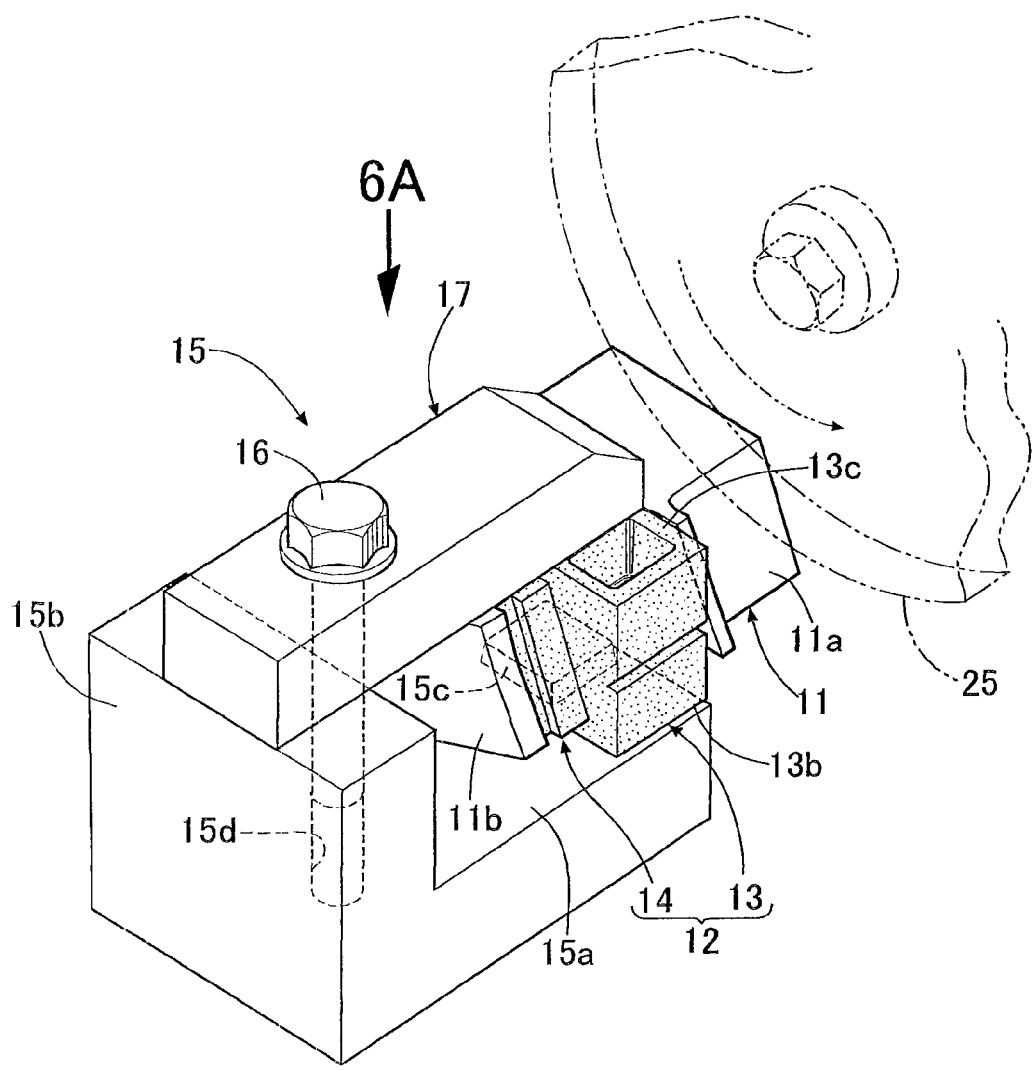
FIG. 4B is a perspective view of the clamping jig (in an assembled state)

As shown in FIGS. 4A and 4B, a clamping jig 15 fixed to the processing table, which is not illustrated, includes: a bottom wall part 15a of a rectangular plate shape; a side wall part 15b standing from one side edge of the bottom wall part 15a; a positioning projection 15c of a square plate shape fixed in a removable manner on the bottom wall part 15a; a bolt 16 screwed into a bolt hole 15d formed in a part of the bottom wall part 15a that is close to the side wall part 15b; and a clamping member 17 that has a bolt hole 17a formed therein, into which hole the bolt 16 is inserted. The positioning projection 15c is formed into a shape such that it can be fitted into the positioning holes 13f, 13h of the resin-made clamping block 12 without clearance therebetween.

Figure 5A:
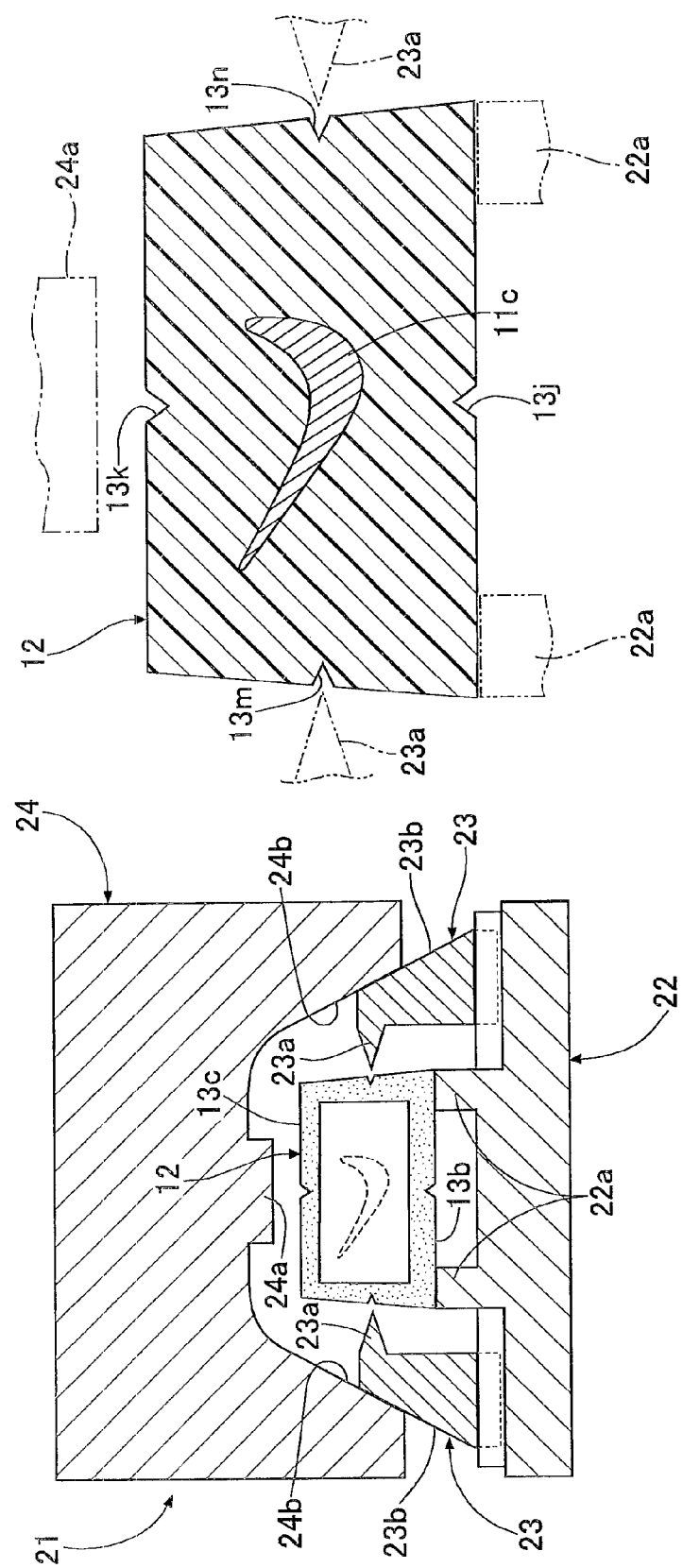
FIGS. 5A to 5C are views showing structures and operations of a resin removing device.
Figure 5B:
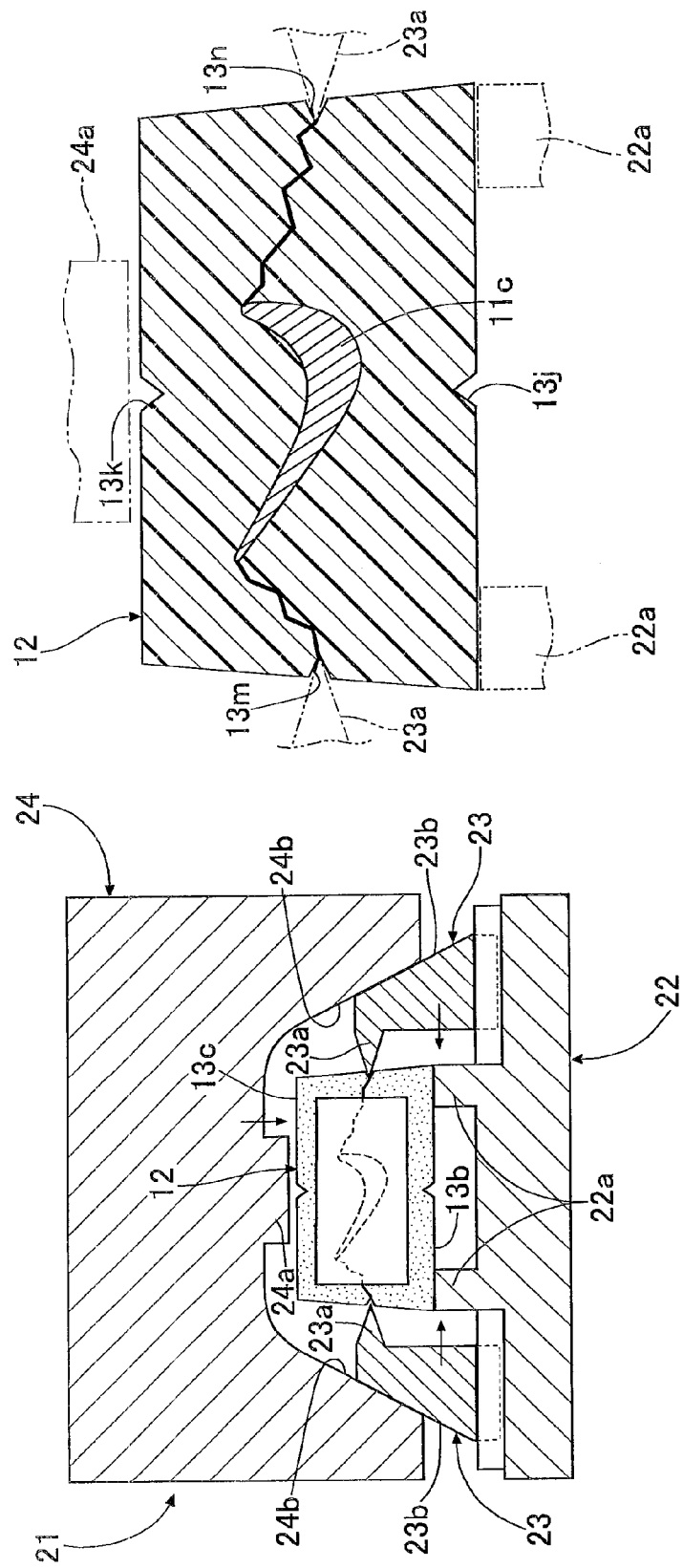
Figure 5C:
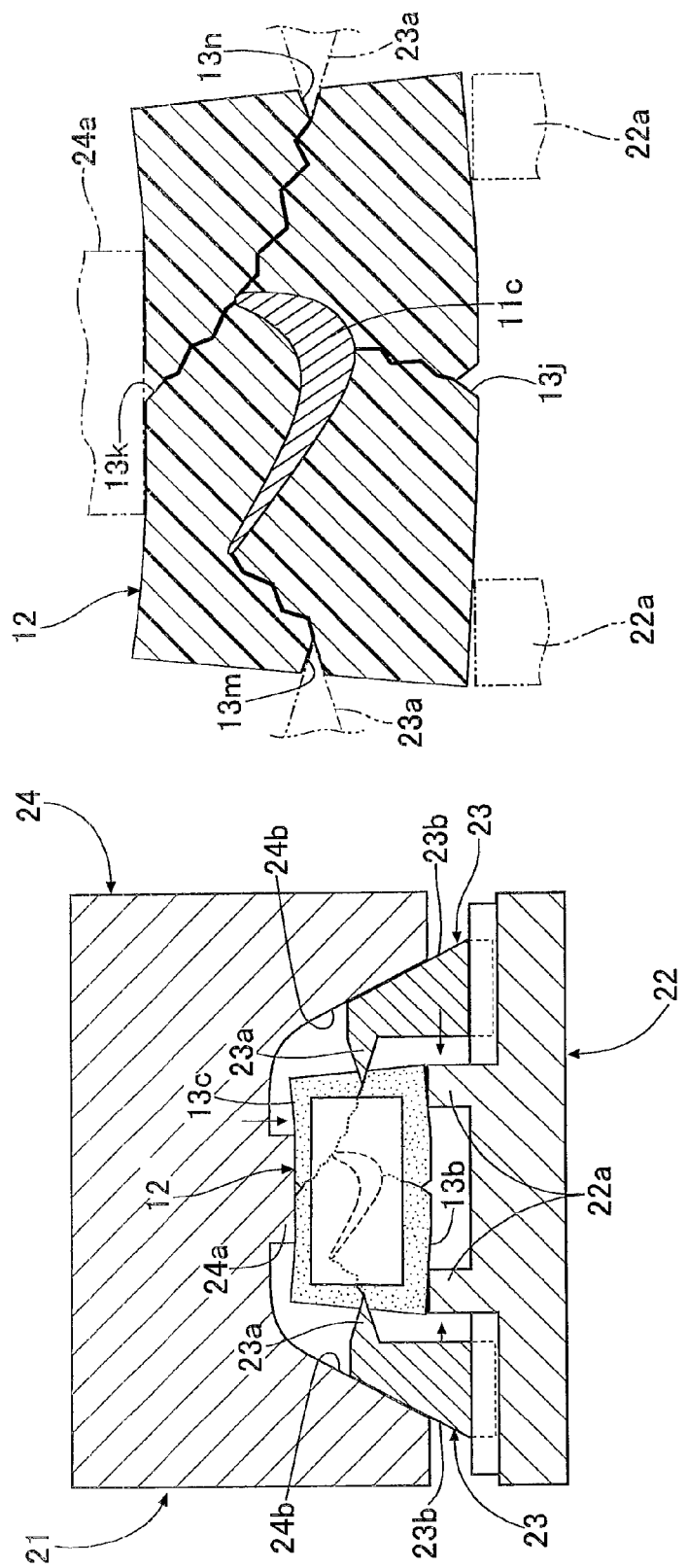

As shown in FIGS. 5A to 5C, a resin removing device 21 for removing the resin-made clamping block 12 from the turbine blade 11 includes: a base plate 22; two seat parts 22a, 22a provided in a protruding manner on an upper face of the base plate 22; a pair of sliders 23, 23 supported by the base plate 22 in a way that they can move closer to and away from each other; wedge members 23a, 23a provided respectively on opposing ends of the sliders 23, 23; an ascending-and-descending member 24 capable of ascending and descending with respect to the base plate 22 by a drive source, which is not illustrated; a press part 24a provided in a protruding manner on a lower face of the ascending-and-descending member 24; drive cam faces 24b, 24b formed on opposite end portions of the ascending-and-descending member 24 so as to be opposed to each other; follower cam faces 23b, 23b provided respectively on the pair of sliders 23, 23 and abutting against the drive cam faces 24b, 24b.

Next, operations of the embodiment of the present invention having the above configuration will be described.

As shown in FIGS. 4A and 4B, when a Christmas tree is grinded at the base end portion 11a of the turbine blade 11, while the positioning hole 13f of the first reference surface 13b of the resin-made clamping block 12 molded integrally so as to cover the blade portion 11c of the turbine blade 11 is fitted on the positioning projection 15c of the bottom wall part 15a of the clamping jig 15 provided on the not-illustrated processing table, the bolt 16 is screwed into the bolt hole 15d of the bottom wall part 15a; and this causes the second reference surface 13c of the resin-made clamping block 12 to be pressed in the downward direction by one end of the clamping member 17 which has the other end abutting against an upper face of the side wall part 15b. As a result, the positioning hole 13f and the positioning projection 15c, both of which are tapered, are fitted with each other and the flat first reference surface 13b is in intimate contact with the flat bottom wall part 15a of the clamping jig 15; accordingly, the resin-made clamping block 12 is fixed in a state where it is positioned with respect to the clamping jig 15.

In this state, by using a grindstone 25 of a grinding processing machine, a Christmas tree can be processed at the base end portion 11a of the turbine blade 11. Since the turbine blade 11 is positioned with high accuracy with respect to the clamping jig 15, it is possible to enhance the processing accuracy of the base end portion 11a of the turbine blade 11. Furthermore, since there is no need to directly clamp the turbine blade 11, which is formed of a complicated shape having three-dimensional curved surfaces, there is no fear that a surface of the turbine blade 11 might be damaged or the turbine blade 11 might be deformed.

Further, in order to process an opposite side surface of the base end portion 11a of the turbine blade 11, only the following works are necessary: the front and back of the resin-made clamping block 12 are reversed so that the second reference surface 13c faces downward; and while the positioning hole 13h of the second reference surface 13c is fitted onto the positioning projection 15c of the bottom wall part 15a of the clamping jig 15, the first reference surface 13b is pressed downward with the one end of the clamping member 17.

Further, as shown in FIGS. 6A and 6B, if the positioning hole 13f or the positioning hole 13h is fitted onto and fixed to the positioning projection 15c in a state where the resin-made clamping block 12 is rotated around 180 degrees within the horizontal surface, it is possible to make the tip end portion 11b of the turbine blade 11 face the processing machine and perform the grinding processing. Since the positioning holes 13f, 13h and the positioning projection 15c are respectively formed of a square shape, it is possible to clamp the resin-made clamping block 12 in four postures, which are different by 90 degrees (if the first and second reference surfaces 13b, 13c are reversed, in eight postures), thereby enabling the easy processing of an arbitrary portion of the turbine blade 11.

After the processing of the turbine blade has been finished in the above way, the resin-made clamping block 12, which becomes unnecessary, needs to be separated and removed from the turbine blade 11. To attain the object, as shown in FIG. 5A, while opposite end portions of the first reference surface 13b (or the second reference surface 13c) of the resin-made clamping block 12 are supported by the two seat parts 22a, 22a of the base plate 22 of the resin removing device 21, the ascending-and-descending member 24 is descended toward the base plate 22 by use of a hydraulic hand press device, which is not illustrated. Then, as shown in FIG. 5B, the pair of sliders 23, 23 that have the follower cam faces 23b, 23b which are pressed by the drive cam faces 24b, 24b of the base plate 22 are moved in a direction in which they come closer to each other, and the wedge members 23a, 23a engage with the notches 13m, 13n of the first and second end surfaces 13d, 13e of the resin-made clamping block 12 and push them to open, thereby generating cracks with the notches 13m, 13n being starting portions.

As shown in FIG. 5C, when the ascending-and-descending member 24 is further descended toward the base plate 22, the press part 24a of the ascending-and-descending member 24 presses the second reference surface 13c of the resin-made clamping block 12 in the downward direction. Accordingly, bending moment is applied to the resin-made clamping block 12 where the opposite ends of the first reference surface 13b thereof are supported by the seat parts 22a, 22a, and the stress is concentrated on the notches 13j, 13k of the first and second reference surfaces 13b, 13c, thereby generating cracks with the notches 13j, 13k being starting portions.

As a result, four cracks which start at the four notches 13j, 13k, 13m, 13n extend inside of the resin-made clamping block 12 to the positions reaching the blade portion 11c of the turbine blade 11, and thus the resin-made clamping block 12 is divided into four pieces and separated from the turbine blade 11. Accordingly, even if the blade portion 11c is formed of a three-dimensional shape, the resin-made clamping block 12 can be reliably separated from the blade portion 11c by dividing the resin-made clamping block 12 into four pieces.

As described above, cracks can be generated in the resin-made clamping block 12 from four directions by only a simple action of descending the ascending-and-descending member 24. Therefore, not only the work to separate the resin-made clamping block 12 from the turbine blade 11 can be effectively performed, but also pieces of the resin-made clamping block 12 can be removed completely without remaining on the turbine blade 11. Further, since the resin-made clamping block 12 is not broken by a mechanical strike, there is no fear that the turbine blade 11 may be damaged due to an erroneous setting of the strike force.

An embodiment of the present invention is explained above, but the present invention is not limited to the above-mentioned embodiment and may be modified in a variety of ways as long as the modifications do not depart from the gist of the present invention.

For example, shapes of the positioning holes 13f, 13h and the positioning projection 15c are not limited to square shapes in the embodiment, but a rotationally-symmetric shape such as a regular polygon (a shape where it can be overlapped by rotating certain degrees) is sufficient.

Further, in the embodiment, the resin-made clamping block 12 is separated from the turbine blade 11 by dividing the resin-made clamping block 12 into four pieces, but if the shape of a workpiece is simple and an undercut is not generated, the resin-made clamping block 12 can be separated from the turbine blade 11 by dividing the resin-made clamping block 12 into two pieces.

What is claimed is:

1. A device for removing a clamping block made of resin, configured to separate and remove the resin-made clamping block from a turbine blade, after a mechanical processing is applied to the turbine blade in a state in which the resin-made clamping block molded to cover a part of the turbine blade is fixed to a clamping jig, the resin-made clamping block having a pair of first notches formed respectively in a pair of side surfaces that are opposed to each other, and a pair of second notches formed respectively in a lower face and an upper face of the resin-made clamping block, wherein
the device comprises:
a seat part configured to have the resin-made clamping block placed thereon;
a pair of sliders which are positioned on opposite sides of the seat part, and which are movable closer to and away from the seat part while the resin-made clamping block is placed thereon; and
a pair of wedge members provided respectively on the paired sliders, each of the pair of wedge members configured to engage one of the pair of first notches and to generate cracks in the resin-made clamping block that originate at the pair of first notches by engaging the pair of first notches while the pair of sliders are moved closer to the seat part,
wherein, as said seat part, two seat parts are provided so as to be separated from each other by a predetermined distance, and
the device further comprises an ascending-and-descending member that is provided in a manner capable of ascending and descending with respect to the two seat parts and that is configured to generate cracks in the resin-made clamping block with the second notches being starting portions by pressing the resin-made clamping block from above.

2. The device for removing a clamping block made of resin according to claim 1, wherein
a drive cam face provided on the ascending-and-descending member and follower cam faces provided respectively on the paired sliders abut against each other, so that the paired sliders move closer to each other in accordance with a downward movement of the ascending-and-descending member.

3. The device for removing a clamping block made of resin according to claim 1, wherein the two seat parts are configured to have the resin-made clamping block placed thereon with the second notches disposed between the two seat parts.

4. The device for removing a clamping block made of resin according to claim 1, wherein the ascending-and-descending member has a press part for pressing the resin-made clamping block, said press part having a width less than a distance by which the two seat parts are separated, and the press part is configured to press the block at an area inside of the two seat parts.

5. A system for removing a clamping block made of resin from a turbine blade, comprising:
the clamping block made of resin covering a part of the turbine blade, the resin-made clamping block having a pair of first notches formed respectively in a pair of side surfaces that are opposed to each other; and
a device configured to separate and remove the resin-made clamping block from the turbine blade, wherein
the device comprises:
a seat part configured to have the resin-made clamping block placed thereon;
a pair of sliders which are positioned on opposite sides of the seat part, and which are movable closer to and away from the seat part while the resin-made clamping block is placed thereon; and
a pair of wedge members provided respectively on the paired sliders, each of the pair of wedge members configured to engage one of the pair of first notches and to generate cracks in the resin-made clamping block that originate at the pair of first notches by engaging the pair of first notches while the pair of sliders are moved closer to the seat part.

6. The system for removing the clamping block made of resin from the turbine blade according to claim 5, wherein second notches are formed respectively in a lower face and an upper face of the resin-made clamping block, and wherein
as said seat part, two seat parts are provided so as to be separated from each other by a predetermined distance, and
the device further comprises an ascending-and-descending member that is provided in a manner capable of ascending and descending with respect to the two seat parts and that is configured to generate cracks in the resin-made clamping block with the second notches being starting portions by pressing the resin-made clamping block from above.

7. The system for removing the clamping block made of resin from the turbine blade according to claim 6, wherein
a drive cam face provided on the ascending-and-descending member and follower cam faces provided respectively on the paired sliders abut against each other, so that the paired sliders move closer to each other in accordance with a downward movement of the ascending-and-descending member.

8. The system for removing the clamping block made of resin from the turbine blade according to claim 5, wherein the pair of sliders and the pair of wedge members are configured so that at least a portion of each of the pair of wedge members is received in the one of the pair of first notches formed in the resin-made clamping block when the pair of sliders are moved closer to the seat part while the resin-made clamping block is placed on the seat part.

9. The system for removing the clamping block made of resin from the turbine blade according to claim 6, wherein the pair of sliders and the pair of wedge members are configured so that at least a portion of each of the pair of wedge members is received in the one of the pair of first notches formed in the resin-made clamping block when the pair of sliders are moved closer to the seat part while the resin-made clamping block is placed on the seat part.

10. The system for removing the clamping block made of resin from the turbine blade according to claim 7, wherein the pair of sliders and the pair of wedge members are configured so that at least a portion of each of the pair of wedge members is received in the one of the pair of first notches formed in the resin-made clamping block when the pair of sliders are moved closer to each other and the seat part while the resin-made clamping block is placed on the seat part.

11. The system for removing the clamping block made of resin from the turbine blade according to claim 6, wherein the two seat parts are configured to have the resin-made clamping block placed thereon with the second notches disposed between the two seat parts.

12. The system for removing the clamping block made of resin from the turbine blade according to claim 6, wherein the ascending-and-descending member has a press part for pressing the resin-made clamping block, said press part having a width less than a distance by which the two seat parts are separated, and the press part presses the block at an area inside of the two seat parts.

* * * * *